US007365655B2

(12) United States Patent
Rao et al.

(10) Patent No.: US 7,365,655 B2
(45) Date of Patent: Apr. 29, 2008

(54) TRANSCODING MEDIA CONTENT FROM A PERSONAL VIDEO RECORDER FOR A PORTABLE DEVICE

(75) Inventors: Ram R. Rao, Portland, OR (US); Jeffrey S. McVeigh, Portland, OR (US); Sudheer Sirivara, Hillsboro, OR (US); Vaughn S. Iverson, Seattle, WA (US); Gary A. Martz, Jr., Hillsboro, OR (US); Daniel R. Wagner, Portland, OR (US); Kenneth M. Salzberg, Newberg, OR (US)

(73) Assignee: Intel Corporation, Santa Clara, CA (US)

(*) Notice: Subject to any disclaimer, the term of this patent is extended or adjusted under 35 U.S.C. 154(b) by 772 days.

(21) Appl. No.: 10/843,964

(22) Filed: May 12, 2004

(65) Prior Publication Data

US 2004/0250291 A1   Dec. 9, 2004

Related U.S. Application Data

(63) Continuation of application No. 10/172,397, filed on Jun. 14, 2002, now Pat. No. 6,937,168.

(51) Int. Cl.
*H03M 7/00* (2006.01)

(52) U.S. Cl. ............................ 341/50; 341/51; 725/34
(58) Field of Classification Search ................. 341/50, 341/51; 725/34–36
See application file for complete search history.

(56) References Cited

U.S. PATENT DOCUMENTS 6,490,432 B1   12/2002   Wegener et al.
6,760,916 B2*   7/2004   Holtz et al. .................... 725/34

FOREIGN PATENT DOCUMENTS

| EP | 1049305 A1 | 11/2000 |
| EP | 1187485 A1 | 3/2002 |
| EP | 1 195 998 A1 | 4/2002 |
| WO | WO 01/47248 A2 | 6/2001 |
| WO | WO 01/69936 A2 | 9/2001 |
| WO | PCT/US 03/18409 | 8/2003 |
| WO | PCT/US03/18409 | 7/2005 |

* cited by examiner

*Primary Examiner*—Brian Young
(74) *Attorney, Agent, or Firm*—Blakely, Sokoloff, Taylor & Zafman LLP (57) ABSTRACT

A media signal is controlled using a portable media content device. The media signal is received and encoded into an encoded media signal for a portable media content device. The encoded media signal is stored for playback on the portable media content device.

21 Claims, 5 Drawing Sheets

TRANSCODING MEDIA CONTENT FROM A PERSONAL VIDEO RECORDER FOR A PORTABLE DEVICE

CROSS REFERENCE TO RELATED APPLICATIONS

This application is a Continuation of U.S. patent application Ser. No. 10/172,397, filed Jun. 14, 2002 now U.S. Pat. No. 6,937,168.

BACKGROUND

1. Field

Embodiments of the invention relate generally to the field of transcoding media content and more specifically to the field of transcoding media content for a portable/removable media content device using metadata to control the media signal.

2. Background

Media content, such as a live television broadcast that is normally captured and recorded on a personal video recorder (PVR) is not suited for use on a handheld portable media content device. PVRs such as TIVO™ or Replay TV™ are designed to record audio/video signals for play back at high resolution on full size television monitors. The nature of the handheld portable media content device requires the device to have a smaller viewing screen, and often a much lower-resolution viewing screen. The storage space available on the portable device is also limited, and usually only a fraction of what is available on a PVR.

The bitrate, framerate, resolution, and codec used on the PVR leads to non-ideal performance on the handheld device. For example, a PVR normally captures video in MPEG2 format at 24 Mbps. At this bit rate, only 5-10 minutes of content could be stored on a portable media content device with 128 MB of storage. The amount of storage space on a portable device cannot easily be expanded and requirements on device size, power consumption, and cost dictate relatively small amounts of storage. The portable device generally does not need to have media content encoded at a bitrate suitable for full size audio/video equipment due to the limited resources of the portable device, e.g., smaller viewing screen and smaller audio system. It is better to have content that is tailored to the capabilities of the device. Furthermore, present PVRs have no way of intelligently skipping certain media content selections that are broadcast based on a user's viewing/listening history on the portable device.

BRIEF DESCRIPTION OF THE DRAWINGS

The invention may best be understood by referring to the following description and accompanying drawings that are used to illustrate embodiments of the invention. The invention is illustrated by way of example and is not limited in the figures of the accompanying drawings, in which like references indicate similar elements. In the drawings.

DETAILED DESCRIPTION

In the following detailed description, numerous specific details are set forth. However, it is understood that embodiments of the invention may be practiced without these specific details. In other instances, well-known circuits, structures, and techniques have not been shown in detail in order not to obscure the understanding of this description. These embodiments are described in sufficient detail to enable those skilled in the art to practice the invention. The following detailed description is, therefore, not to be taken in a limiting sense, and the scope of the invention is defined only by the appended claims.

Media content is transcoded by a device, such as a recording station, into an appropriate format for display on a handheld media content device. The recording station uses metadata to control the transcoding of selections of media content from the media content stream. Metadata, as used in this description, includes program metadata, user media data, format media data, and control metadata. Metadata is data that is either associated with the media content or is derived from the media content with consideration of the user's interaction with the media content. User metadata is derived from the user's viewing activity. Many different types of information can be used as user metadata. A nonexclusive list of some examples of user metadata are: the types of shows viewed by the user or the types of shows not viewed by the user; the number of times a show is viewed by the user; the type of stock viewed by the user or the types of stock not viewed by the user; the TV channels watched by the user. User metadata embodies the concept of user preference with respect to media content and is therefore flexible, encompassing a wide variety of data derived from the media content and the preferences of the user such as viewing and/or listening habits. Some examples of program metadata for video programs are, the title of a show, the time of broadcast of a show, the type of show, i.e., comedy, western, action, etc. Examples of format metadata include bitrates, frame rates, encoding options, file sizes, etc. Controlling the transcoding of media content can range from a manual operation, where the user is involved in making the selections of media content and specifying the quality to fully automatic operation where the user does not have to provide input into the process of obtaining transcoded media content on the portable device. Examples of control metadata include selection or exclusion of shows to be transcoded and selection of a quality level for the transcoding. In various embodiments of the invention, the functionality of the recording station can exist in one device or it can be distributed across several devices.

As mentioned previously, media content is transcoded for a portable device. Media content can include audio, video, and image data or a combination thereof. In general, the media content can be any media content that allows for the tradeoff between media content file size and quality (any media content that can be encoded with loss to achieve a particular file size). Such media content includes but is not limited to any single audio or video file, or group thereof as well as images. Images are not limited to digital images from a digital camera but can include the presentation of data in various forms. An example of lossy compression of stock market data could be to restrict a group of data displayed to those companies with a market capitalization under or above a certain value. Another example could be to display a map showing only those rivers in a given geographic area that yield over or under a certain amount of Salmon annually. Instead of a map, the data could be displayed as a list of river names. The use of the term media content is not to be taken in a restrictive sense but as mentioned above, incorporates any media content that can be encoded with loss to achieve a particular file size. In the case of data as media content, loss can be applied to both the data set of companies or rivers (in the examples above) as well as to the encoding used to change the number of bits in the image displayed for viewing. Thus, media content is inclusive and will in various embodiments of the invention include music, movies, and the display of data such as text and/or images. In one or more embodiments, the media content can be associated with Internet web pages.

Figure 1:
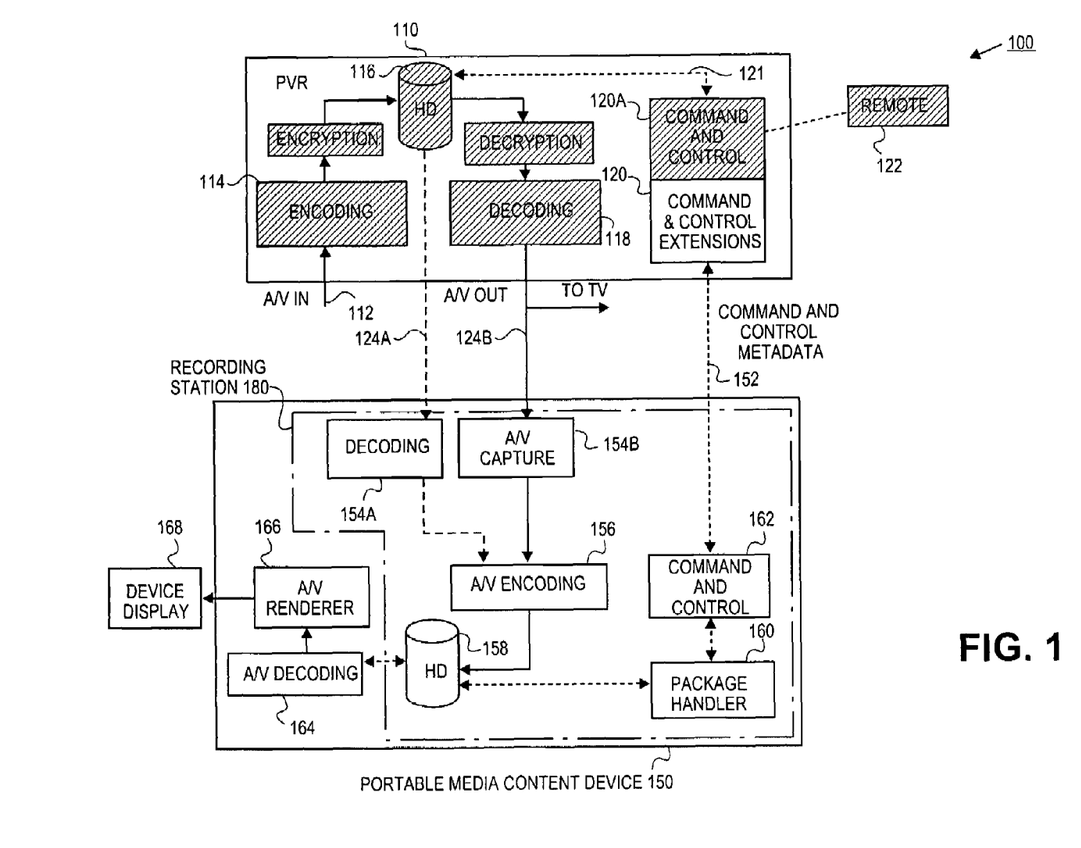
FIG. 1 depicts a personal video recorder (PVR) being controlled by a portable media content device by means of metadata.

FIG. 1 depicts in 100 a personal video recorder (PVR) being controlled by a portable media content device (PMCD) by means of metadata. The PVR 110, shown in FIG. 1, accepts an analog or digital media content input signal at 112. The input signal is encoded at 114 and stored on a storage device 116. The encoded media signal is output at 124a and/or decoded at 118 and output at 124b. The output at 124b is available to be viewed on a television or to be transcoded for viewing on a portable media content device 150.

The PVR 110 can be configured in a variety of ways as will be apparent to those of ordinary skill in the art. For example, the PVR 110 can reside on a personal computer or be configured as a standalone appliance. Additionally, the PVR 110 can be integrated into a set-top box which would be part of a system used to receive audio/video content. The present invention is not limited by the way the PVR 110 is configured.

Command and control metadata 152 is received at the PVR via command and control extensions 120. Command and control extensions 120 can be added to existing personal video recorders, such as those sold under the trade name TIVO™ or ReplayTV™. When command and control extensions are added to these existing personal video recorders, the video recorders modified thereby, will perform as the personal video recorder described herein. Command and control metadata is used to categorize which of the media selections, stored on the storage device 116, to output via 124a and/or 124b to the PMCD 150. Alternatively, command and control metadata can be used by the PVR to record to the storage device 116 only those selections to be transferred to the PMCD 150. Command and control extensions 120 can be coupled with the command and control system of the PVR, 120a, which controls the storage device 116 by means of communications link 121. Remote control 122, used to control the PVR, can be used to facilitate using the metadata to control the selections of media content to be transferred to the PMCD 150 or to set up automatic or semiautomatic transfer of media content to the PMCD 150.

The PMCD 150, shown in FIG. 1, embodies the functionality of both the recording station and the functionality required to play media content on a portable platform. In various embodiments of the invention described herein, the functionality of the recording station will exist in various distributions across one or more devices. In one embodiment, the recording station will exist as a self-contained device. In another embodiment, the functionality of the recording station will be distributed across several devices.

In yet another embodiment, the recording station will exist as a portion of a device as illustrated by a recording station 180 in FIG. 1. In general, two channels of communication are required between the PVR and the recording station; the control channel and the media channel. In the embodiment shown in FIG. 1, the control channel is shown at 152 and the media channel is shown with 124a and/or 124b. Metadata flows from PMCD 150 to the PVR 110 over 152. Some examples of communication links that can be used to provide the control channel include a serial interface, an infrared interface, a universal serial bus (USB) interface, or a stream over a digital network. Network communication can be either hardwired or wireless. An example of wireless network communication can be via Bluetooth or IEEE 802.11. Similarly, the media channel 124a and/or 124b can flow over a variety of communication links that are know to those of ordinary skill in the art.

The control channel allows the devices, the PVR and the PMCD, to exchange messages. In some cases these may be control messages. For example, the recording station may send a message to the PVR to have the PVR start to play a video program. In other cases, the control channel may be used to pass metadata between the PVR and the recording station. The PVR normally retains a show's title, episode title, synopsis, and airdate. This information can be transmitted over the control channel back to the recording station. Another use for the control channel is to allow user input to one system to be passed to the other. For instance, the user may use the PVR's remote control 122 to delete shows from the recording station's storage device 158. After the user selects the menu option on the PVR, the message is passed over the control channel to the recording station to accomplish the deletion operation.

The media channel is used to transmit the images, audio and video between the PVR and the recording station. In one embodiment, the PMCD 150 may not have the ability to decode the media content input from the PVR. In this case, 124a and 154a, indicated by dashed lines would not be present. Media content would be input over 124b as an analog signal captured by the PMCD at 154b. If the media content were input as an analog signal at 124b then A/V capture subsystem 154b would include the appropriate analog to digital converter electronics required to convert the analog media content to a digital format before encoding at 156. Alternatively, the media signal could be input as a digital signal at 124a, decoded at 154a and then transcoded at A/V encoding subsystem 156 into an encoded format that was suitable for display on the PMCD's display device. The transcoded signal is stored on the storage device 158. Storage device 158 can be any storage device that is suitable for storing digital data in a form factor appropriate for the size of the PMCD 150. Methods of processing the analog and digital formats of the media content signal have been described above, however variations thereof will be apparent to those of ordinary skill in the art. The present invention is not limited by the format of the media content signal, e.g., analog or digital.

There are several mechanisms for transferring media content between the two devices, e.g., the PVR and the recording station (noting that the recording station can be part of the PMCD, as described in conjunction with FIG. 1). A user can initiate a transfer of a specific program between the PVR and the recording station via a "push mechanism." After this transfer is initiated, the PVR can start playing (or transmitting content) and the recording station can start encoding content. The control channel is used to synchronize the transfer from the PVR with the encoding on the recording station. Alternatively, there can be a "sync mechanism" where an external event automatically triggers the transfer to the recording station. Another example is when a handheld device itself serves as the recording station. In one or more embodiments of the invention, PMCD 150 can be a handheld device. As an example of the sync mechanism, whenever the handheld device is connected to the PVR, it may automatically trigger transfer of content from the PVR to the handheld device (which is acting as the recording station). The handheld device can check for any new content that has appeared on the PVR, and transfer each new show individually.

Media content to be transcoded by the recording station for the PMCD 150 can be filtered according to different filter policies acting upon the metadata associated with the media content. The filter policies can be predefined or user defined. For example a predefined policy could be that a certain amount of media content is to be transferred to the PMCD 150 each time communication is established between the two devices. A variation on the policy could be that no transfer is effected if the user has not consumed the content previously transferred to the PMCD 150. Another variation on the policy could be that no transfer is effected if the recorded content on the PVR is not indicated as a preferred content by the user. A user-defined policy could be that news is never transferred and that only movies are transferred. Such a policy, preventing the transfer of the news is exclusive. Policies can be inclusive. An example of an inclusive policy is one that required the serial transfer of content as recorded by the PVR. Thus, content would be transferred as it was recorded by the PVR and as room became available on the PMCD 150 consistent with other policies that could exist in parallel, such as the requirement that content be viewed before being deleted. It should be noted that while several policies have been discussed herein, those of ordinary skill in the art would recognize many other policies that could be used to govern the transfer of content to the PMCD 150. The present invention is not limited by the policy used for controlling the transfer of content to the PMCD 150. Thus, the control of selections of media content to be transferred to the PMCD 150 can range from manual with a large degree of user control to semiautomatic or automatic depending on the particular configuration designated by the user.

Storage device 158 can be fixed within the PMCD 150 or it may be removable. In one embodiment, storage device 158 could be loaded with transcoded media content and then removed from the PMCD 150 and inserted into another PMCD (not shown). The transcoded media content could be played on the second PMCD (not shown). It is possible that the format requirements of the second PMCD could be different from the format requirements of the first PMCD 150 that did the transcoding. In this example, the first PMCD 150 is acting as a recording station for the second PMCD. Additionally, it is possible that the PMCD 150 is equipped with wireless communication such as a Bluetooth network interface or an IEEE 802.11 network interface. In this scenario, the PMCD 150 could wirelessly transfer transcoded media content from the storage device 158 to the second PMCD.

After the media content is transferred to the PMCD 150, the media content can be played on the device display 168 by decoding, at 164, the encoded media content signal previously stored to the storage device 158. The decoded signal would be supplied to the display device 168 by an audio/video renderer 166 by means well known in the art. Encoding the media content signal can be accomplished using various encoding algorithms that are well known in the art such as those that work within the Motion Picture Experts Group (MPEG) standards. Encoding can be accomplished in other ways. The present invention is not limited by the algorithms or standards used to accomplish encoding or transcoding the media content on either the PVR, the recording station or the PMCD 150.

Figure 2:
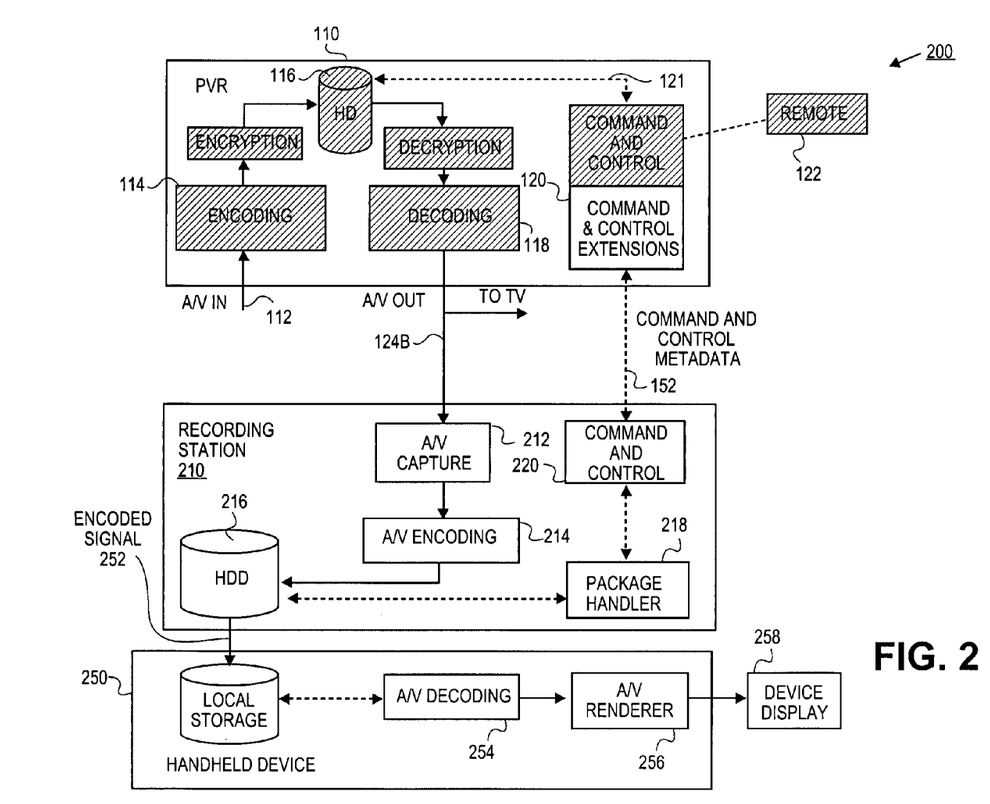
FIG. 2 illustrates a recording station transcoding media content for a handheld device.

In the previous discussion of FIG. 1, the recording station was part of the PMCD 150. In another embodiment of the invention, the recording station can be a separate device as shown in FIG. 2. FIG. 2 illustrates a recording station transcoding media content for a handheld device. With respect to FIG. 2, a recording station 210 is shown in communication with the PVR 110. The media content is input as an analog signal at 124b into A/V capture subsystem 212. The digital output of 212 is encoded at 214 into a format appropriate for display on a handheld device 250. The digital output is stored on a storage device 216. A package handler 218 and command and control 220 cause appropriate metadata to flow to the PVR 110 to control the transfer of media content between the PVR and the recording station.

Transcoding the media content can be initiated by either the recording station or the PVR. In: one embodiment of the invention, if new media content is available, the recording station 210 could download metadata relating to the new content (such as show title, channel, time, duration, etc.). The recording station 210 can request the PVR 110 to start playing the new content, and at the same time, start encoding the signal that is being fed to the analog input at 212. The recording station 210 would continue to transcode until the entire program has been played, at which point it would stop transcoding, and save the compressed file and metadata. In another embodiment of the invention, the PVR can act as the master and signal the recording station to start and stop encoding. This may be useful when a person uses the PVR's remote control and requests to transfer content to the handheld device. In one example of this functionality, when the user selects this option, the PVR 110 could send a signal to the recording station 210 (over link 152) and have it start encoding the media content. Then, the PVR 110 would start playing the content that was chosen for transfer. This content would arrive at the analog inputs on the recording station (A/V capture subsystem 212) and be transcoded into the handheld device's video format at 214. When the program was finished, the PVR 110 could signal the recording station 210 to stop transcoding and transfer any metadata about the content to the recording station 210 for storage. After the content has been transcoded and stored by the recording station, it is available for use by the handheld device 250. The user can connect the handheld device 250 to the recording station 210 and download any content they wish to view. Content is viewed on display device 258 after the compressed video and/or audio sequences are decoded by means of A/V decoding subsystem 254 and rendered by A/V renderer 256.

Figure 3:
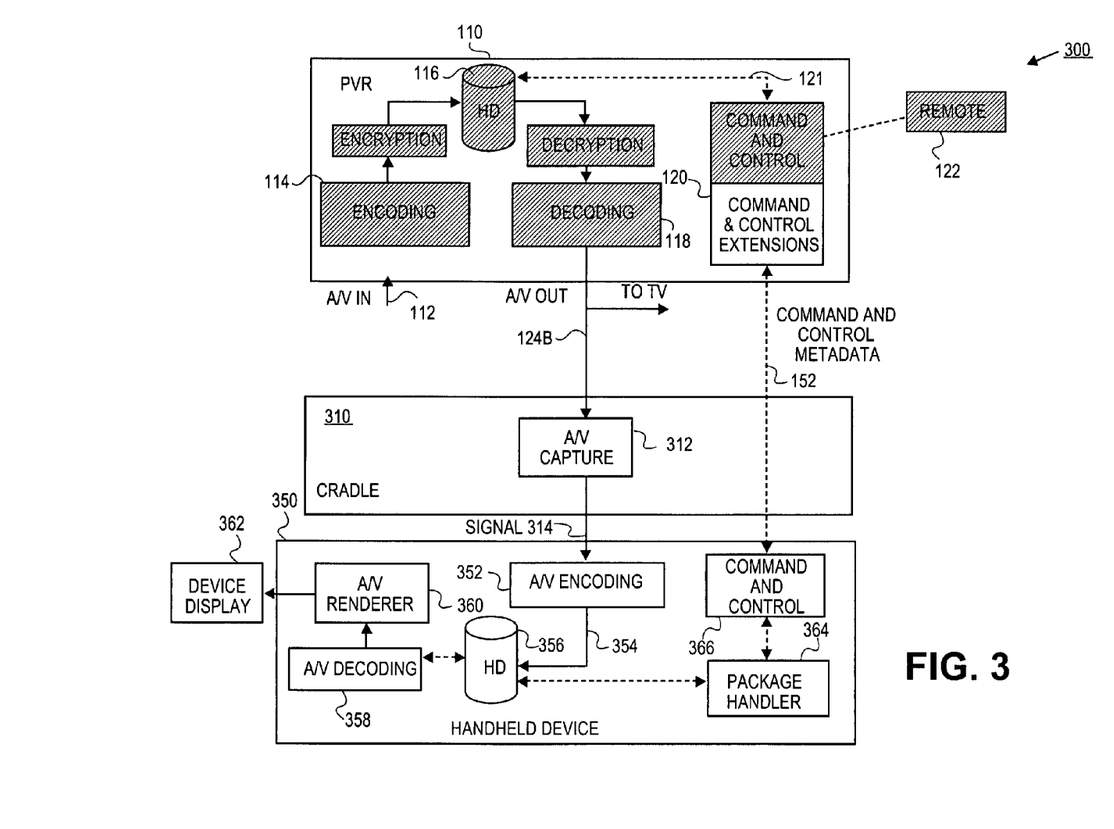
FIG. 3 illustrates spreading the recording station's functionality between two devices.

In another embodiment of the invention, the functionality of the recording station is distributed between the handheld device and a second device. The second device can be a cradle as shown in FIG. 3. However, those of ordinary skill in the art will appreciate that the second device is not limited to being a cradle. In another embodiment of the invention, the second device could contain any part of the recording station. FIG. 3 illustrates spreading the recording station's functionality between two devices, where one is a cradle. With reference to FIG. 3, the handheld device 350 contains a storage device 356 and a processor, such as A/V encoding 352, capable of transcoding the digital media signal input on 314 which is derived from the analog media signal input 124b via an A/V capture subsystem 312 which digitizes the media signal. The cradle 310 contains the A/V subsystem, which contains the signal communication path e.g., A/V jacks and analog-to-digital (AD) conversion subsystem. When the handheld device 350 is docked in it's cradle 310, the combination has all of the functionality of the recording station described previously in conjunction with FIG. 1 and/or FIG. 2.

Transfer of media content can occur according to the "sync" mechanism described earlier in conjunction with FIG. 1. With reference to FIG. 3, for example when the handheld device 350 is docket in its cradle 310, the handheld device 350 could get a list of new programs that have been recorded by the PVR 110. For each program, it can download the metadata, and initiate a new transfer between the PVR 110 and the handheld device 350. The PVR 110 would start playing media content, the media content would be digitized by 312 and the handheld device 350 would start transcoding the digital input signal 314. The "sync" mechanism would mirror all content that is available on the PVR 110 onto the handheld device 350.

Figure 4:
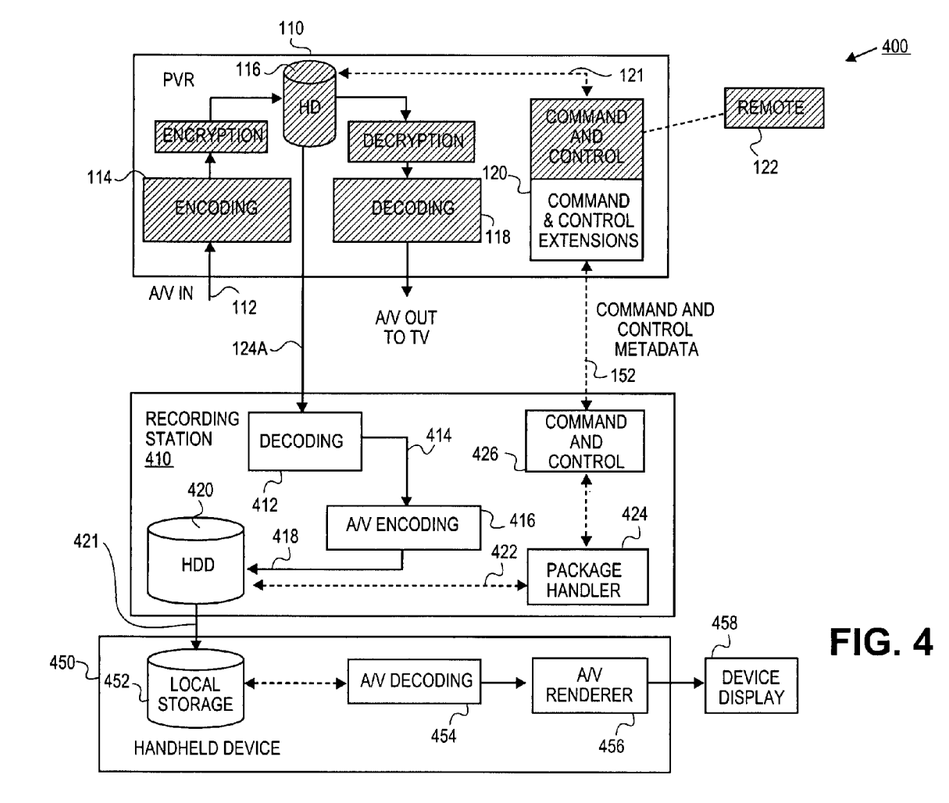
FIG. 4 illustrates using a network to provide communication between the recording station and the personal video recorder.

As mentioned above, in conjunction with FIG. 1, the media content can be input to a recording station as a digital signal. In one embodiment, a digital network connection, such as Ethernet or 802.11, can exist between the PVR and the recording station. FIG. 4 illustrates using a network to provide communication between a recording station 410 and the PVR 110. The media content is input to the recording station 410 as a digital signal 124a. The command and control metadata 152 is transferred as a different stream over the Internet Protocol (IP) network. The recording station 410 can query for content on the PVR 110 and have the PVR 110 start and stop programs from being recorded or transmitted to the recording station 410. The media content is transmitted to the recording station as a compressed digital stream over the network to the recording station 410. The recording station 410 decodes the digital stream at 412 and then re-encodes the digital stream, at 416, into a handheld device 450's video and/or audio format. The transcoded signal 418 is stored on a storage device 420 in the recording station 410. The transfer of the program, user, and format metadata is processed by the data package handler 424 and is associated with the transcoded stream. Control metadata is used to control and monitor the flow of information to the storage device 420. This control information is sent by command and control 426 to the PVR 110.

The transcoded media content that is stored on storage device 420 can be copied to the handheld device's local storage 452 by methods that are well known in the art. Those of ordinary skill in the art will recognize that the handheld device 450 could be mechanically coupled to the recording station 410 to permit the necessary communication path to exist between the two devices. Alternatively or in conjunction with the mechanical coupling, wireless transfer of data can be done between the two devices using a Bluetooth network connection or an IEEE 802.11 network connection. Other wireless network connections can be implemented between the two devices.

The handheld device 450 can be removed from the proximity of the recording station 410 and can be used to play back the audio and/or video signals stored on the local storage 452. The signal is read from the local storage 452, input into the A/V decoding subsystem 454, rendered on 456 and displayed on the deice display 458.

Figure 5:
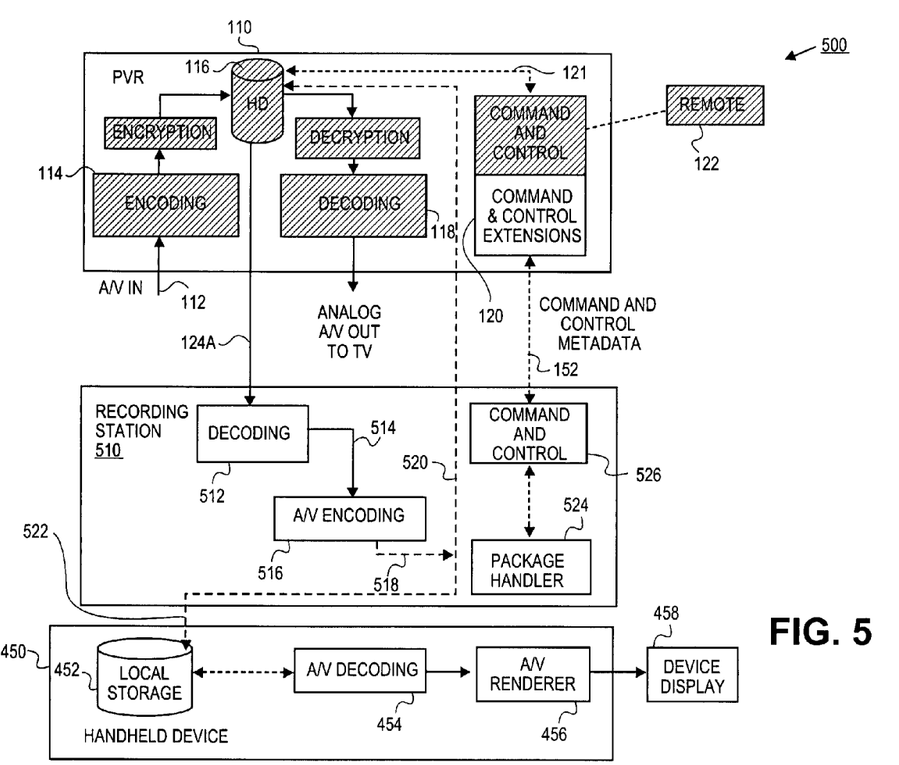
FIG. 5 illustrates a recording station that uses personal video recorder storage instead of maintaining local storage on the recording station.

The functionality of the recording station 410, shown in FIG. 4, can be distributed as previously taught between different devices. In an alternative embodiment, instead of using the storage device 420 on the recording station, the transcoded media content can be sent back to the storage device in the PVR. FIG. 5 illustrates a recording station that uses PVR storage instead of maintaining local storage on the recording station. With reference to FIG. 5, a recording station 510 is configured with the PVR 110 using a digital connection. The recording station 510 contains decoder 512, A/V encoding subsystem 516 to produce a transcoded media content signal 518, package handler 524 and command and control 526. These components work together following the description that pertains to FIG. 4. However, the transcoded signal 518 is transferred up as 520 to be stored on the PVR's storage device 116.

The handheld device 450 can receive media content that has been transcoded for its format directly from the PVR's storage deice 116. This transfer can be performed by means that are well known in the art, including the means that have been discussed previously. For example, direct mechanical connection, wireless connection, etc. In one or more embodiments, the storage device within the handheld can be removable from the handheld 450 and inserted into either the recording station or the PVR. In such a configuration, transcoded media content would be transferred to the removable storage device and then the removable storage device would be reinserted into the handheld device 450 for play back on device display 458 and/or an audio system (not shown) within the handheld device 450.

Eliminating the storage device on the recording station 510 has the advantage of creating a cheaper recording station (since mass storage is not needed), thus allowing the media content transcoded for the handheld device to be retrieved directly from the PVR.

Another embodiment of the invention uses a personal computer (PC) as the recording station. The recording station 510 in FIG. 5 can be a personal computer according to this embodiment. In this embodiment, the PC would contain the software necessary to perform the functions of the recording station. The PVR would be connected to a network along with the PC. The PC can then control the PVR and have it send compressed video and/or audio to the PC as media content signal 124a. The PC can then decode this signal, recompress it to the handheld's video and/or audio format and either save the sequences to the PC's storage device (not shown), or send it back to the PVR for storage.

It will be appreciated that the methods described in conjunction with the figures may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-readable medium having stored thereon instructions that may be used to program a computer (or other electronic devices) to perform the methods. For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to include, but not be limited to, solid-state memories, optical and magnetic disks, and carrier wave signals. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

While the invention has been described in terms of several embodiment, those skilled in the art will recognize that the invention is not limited to the embodiments described, but can be practiced with modification and alteration within the spirit and scope of the appended claims. The description is thus to be regarded as illustrative instead of limiting. Accordingly, all such variations and modifications are included within the intended scope of the invention as defined by the following claims.

What is claimed is:

1. A method, comprising:
    retrieving from a personal video recorder media content and format metadata, and program metadata, the format metadata comprising bit rate, frame rate, and or resolution associated with the media content, the program metadata comprising title of media content, time of broadcast of media content, and/or type of media content; and
    transcoding at a handheld display device the media content and program metadata into a format compatible with a handheld display device using the format metadata.

2. The method of claim 1, further comprising initiating a first request to begin transfer of media content from the personal video recorder and a second request to end transfer of media content from the personal video recorder.

3. The method of claim 2, further comprising issuing a query to the personal video recorder, the query to determine whether there is new media content to retrieve from the personal video recorder.

4. The method of claim 1, further comprising receiving a first request to begin transfer of media content from the personal video recorder and a second request to end transfer of media content from the personal video recorder.

5. The method of claim 4, further comprising receiving the first request and the second request from the handheld display device.

6. The method of claim 4, further comprising receiving the first request and the second request from the personal video recorder.

7. The method of claim 4, further comprising:
    decoding media content video based on a video format used by the personal video recorder;
    encoding the media content video based on the video format used by the handheld display device; and
    transferring the encoded media content video to the personal video recorder.

8. An apparatus, comprising:
    first circuitry in a handheld display device to retrieve from a personal video recorder media content and format metadata, and program metadata, the format metadata comprising bit rate, frame rate, and/or resolution associated with the media content, the program metadata comprising title of media content, time of broadcast of media content, and/or type of media content; and
    second circuitry in the handheld display device to transcode the media content and program metadata into a format compatible with a handheld display device using the format metadata.

9. The apparatus of claim 8, further comprising third circuitry to initiate a first request to begin transfer of media content from the personal video recorder and a second request to end transfer of media content from the personal video recorder.

10. The apparatus of claim 9, further comprising fourth circuitry to issue a query to the personal video recorder, the query to determine whether there is new media content to retrieve from the personal video recorder.

11. The apparatus of claim 8, further comprising third circuitry to receive a first request to begin transfer of media content from the personal video recorder and a second request to end transfer of media content from the personal video recorder.

12. The apparatus of claim 11, further comprising fourth circuitry to receive the first request and the second request from the handheld display device.

13. The apparatus of claim 11, further comprising receiving the first request and the second request from the personal video recorder.

14. The apparatus of claim 11, further comprising:
    decoding media content video based on a video format of the personal video recorder;
    encoding the media content video based on the video format used by the handheld display device; and
    transferring the encoded media content video to the personal video recorder.

15. An article of manufacture comprising:
    a machine-accessible medium including data that, when accessed by a machine, cause the machine to perform operations comprising:
        retrieving from a personal video recorder media content, format metadata, and program metadata, the format metadata comprising bit rate, frame rate, and/or resolution associated with the media content, the program metadata comprising title of media content, time of broadcast of media content, and/or type of media content; and
        transcoding at a handheld display device the media content and program metadata into a format compatible with a handheld display device using the format metadata.

16. The article of manufacture of claim 15, wherein the machine-accessible medium further includes data that cause the machine to perform operations comprising initiating a first request to begin transfer of media content from the personal video recorder and a second request to end transfer of media content from the personal video recorder.

17. The article of manufacture of claim 16, wherein the machine-accessible medium further includes data that cause the machine to perform operations comprising issuing a query to the personal video recorder, the query to determine whether there is new media content to retrieve from the personal video recorder.

18. The article of manufacture of claim 15, wherein the machine-accessible medium further includes data that cause the machine to perform operations comprising receiving a first request to begin transfer of media content from the personal video recorder and a second request to end transfer of media content from the personal video recorder.

19. The article of manufacture of claim 18, further comprising receiving the first request and the second request from the handheld display device.

20. The article of manufacture of claim 18, further comprising receiving the first request and the second request from the personal video recorder.

21. The article of manufacture of claim 18, further comprising:

decoding media content video based on a video format used by the personal video recorder;

encoding the media content video based on the video format used by the handheld display device; and transferring the encoded media content video to the personal video recorder.

* * * * *